United States Patent Office 3,405,123
Patented Oct. 8, 1968

3,405,123
PROCESS FOR PREPARING 1,4-BENZO-
DIAZEPIN-2-ONES
Arthur Stempel, Teaneck, and Leo Henryk Sternbach,
Upper Montclair, N.J., assignors to Hoffmann-La Roche
Inc., Nutley, N.J., a corporation of New Jersey
No Drawing. Continuation-in-part of application Ser. No.
431,174, Feb. 8, 1965. This application Jan. 6, 1966,
Ser. No. 519,017
7 Claims. (Cl. 260—239.3)

ABSTRACT OF THE DISCLOSURE

This invention relates to a process for preparing 1,4-benzodiazepin-2-ones by catalytically hydrogenating a compound of the formula

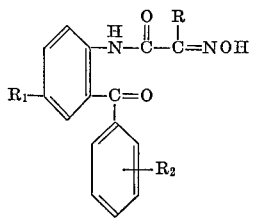

wherein $R_1$ and $R_2$ are hydrogen, halogen, nitro, trifluoromethyl and lower alkyl and R is selected from the group consisting of hydrogen and lower alkyl whereby to effect ring closure thereof to the aforesaid 1,4-benzodiazepin-2-ones.

---

This application is a continuation-in-part of our application Ser. No. 431,174, filed Feb. 8, 1965, now abandoned.

The present invention relates to novel chemical processes and to novel intermediates useful in such chemical processes. More particularly, the present invention relates to novel chemical processes useful for preparing medicinally valuable 1,4-benzodiazepin-2-ones and to novel ketone intermediates useful in such novel chemical processes.

The novel process aspect of the present invention involves hydrolyzing a compound of the formula

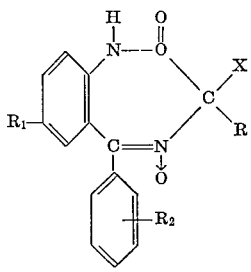

wherein $R_1$ and $R_2$ are selected from the group consisting of hydrogen, halogen, nitro, trifluoromethyl and lower alkyl; R is selected from the group consisting of hydrogen and lower alkyl; and X is halogen in the presence of a water-containing medium whereby to prepare a compound of the formula

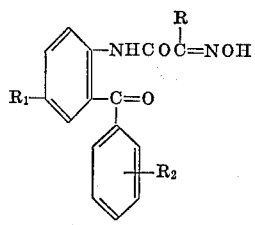

wherein $R_1$, $R_2$ and R are as above and, thereafter, catalytically hydrogenating the so-formed product of Formula II above in the presence of any suitable reducing system whereby ring closure occurs to pharmaceutically desirable benzodiazepines of the formula

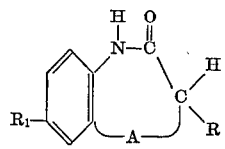

wherein A is selected from the group consisting of

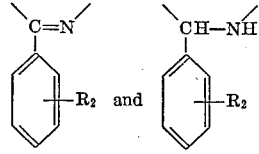

$R_1$ and $R_2$ are selected from the group consisting of hydrogen, halogen, trifluoromethyl, lower alkyl and amino; and R is selected from the group consisting of hydrogen and lower alkyl.

The term "halogen" as used throughout the instant specification is intended to connote all four forms thereof, namely, fluorine, bromine, iodine and chlorine. Especially preferred among the halogens are chlorine and bromine. The term "lower alkyl" as used herein represents a straight or branched chain hydrocarbon group such as methyl, ethyl, isopropyl, propyl and the like. In a preferred embodiment, R in Formulae I, II and III above is hydrogen. In a still more preferred embodiment, R and $R_2$ in the formulae above are both hydrogen.

The starting material of Formula I above may be hydrolyzed with or without isolating the same from the reaction medium in which it is prepared. Thus, it can be hydrolyzed while still present in the reaction medium in which it is prepared. Alternatively, the starting compound of Formula I above may first be isolated and thereafter hydrolyzed according to the procedures set out herein.

The hydrolysis of compounds of Formula I above to the corresponding compounds of Formula II above can be performed in a neutral or acidic water-containing medium. In a preferred aspect, the hydrolysis is effected in any suitable water-containing acidic medium such as, for example, most preferably an aqueous solution of an inorganic mineral acid agent which ionizes readily, e.g. a hydrohalic acid, for example, hydrochloric acid and hydrobromic acid, sulfuric acid and the like or an aqueous solution of an organic acid agent such as acetic acid and toluene sulfonic acid and the like. However, any acidic water-containing medium including one which contains a suitable acid which will effect the hydrolysis of compounds of Formula I above is included within the purview of the present invention. In order to secure sufficient solution of the starting material to effect the desired result, an additional inert organic solvent such as, for example, 1,2-dimethoxyethane, tetrahydrofuran, an ether such as dioxane or an alkanol such as ethanol can comprise a part of the water-containing medium to enhance the solubility of the starting material and/or the end product.

While time is not a critical feature of the first stage of the process of the present invention, to assure good yields of compounds of Formula II above, it is preferred to permit the reaction medium in which the hydrolysis is effected to stand for several hours.

Compounds of Formula II above are novel and are useful as intermediates in the preparation of therapeutically useful benzodiazepines. Thus, they constitute a part of the present invention.

As is noted above, the second stage of the process herein described involves the catalytic hydrogenation of compounds of Formula II above to compounds of Formula III above in the presence of any suitable reducing system. Suitable reducing systems include platinum oxide, palladium on charcoal and the like. The particular reductant employed is not critical. All that is required thereof is that it function efficaciously in this process step and that it be readily removable by conventional techniques.

The catalytic hydrogenation of compounds of Formula II above can be interrupted whereby to obtain a mixture containing compounds of the formula

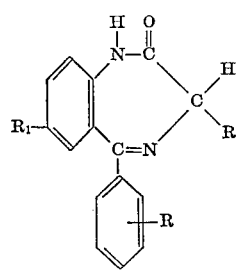

and compounds of the formula

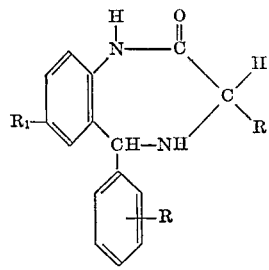

The so-formed mixture can then be resolved into the individual components by conventional isolating procedures. Alternatively, the reaction can be permitted to continue until the calculated amount of hydrogen is taken up whereby compounds of Formula V above are obtained as the major product.

In effecting ring closure of compounds of Formula II above employing the technique recited above, utilizing compounds of Formula II above wherein $R_1$ and/or $R_2$ is nitro, a benzodiazepine of Formula III above is obtained wherein $R_1$ and/or $R_2$ is amino. If desired, the so-formed compound can be converted into the corresponding compounds wherein $R_1$ and/or $R_2$ is halogen by first reacting the said amino compounds with nitrous acid in the presence of a strong mineral acid, such as a hydrohalic acid and reacting the resulting product with a cuprous halide such as cuprous bromide according to conventional techniques.

The foregoing is a description of new and novel processes for the preparation of medicinally valuable 1,4-benzodiazepines and of novel intermediates useful in such a preparation. It will be readily apparent to one skilled in the art that variations in this procedure are possible.

The following examples are illustrative, but not limitative of the procedure for the preparation of the said 1,4-benzodiazepines. All temperatures stated are in degrees centigrade.

Example 1

A solution of 150 ml. of 2 N sodium hydroxide in 1 l. of 1,2-dimethoxyethane was cooled to $+5°$ in an ice bath and 50 g. (0.147 mol.) of 6-chloro-2-dichloromethyl-4-phenylquinazoline 3-oxide were added while stirring. After 30–40 minutes at $+5°$, the mixture was made slightly acid by the addition of 125 ml. of 2 N hydrochloric acid. A 10 ml. aliquot was withdrawn and diluted with an equal volume of water. The crystalline product was filtered off, and after drying in vacuo melted at 193–195°. The infrared spectrum was identical with that of an authentic sample of 3,7-dichloro-1,3-dihydro-5-phenyl - 2H - 1,4 - benzodiazepin-2-one 4-oxide. The remaining original reaction mixture was stirred overnight at room temperature. Dimethoxyethane was then distilled off in vacuo while being replaced with water. The crude oil that separated crystallized on being stirred with water. Crude 2'-benzoyl-4'-chloro-2-hydroxyiminoacetanilide (M.P. 152–160°) was obtained after filtration and drying in vacuo. Recrystallization from benzene gave the product melting at 163–166°.

Example 2

50 grams of 3,7-dichloro-1,3-dihydro-5-phenyl - 2H-1,4-benzodiazepin-2-one 4-oxide was dissolved in a liter of 1,2-dimethoxyethane. The resultant solution was acidified with 25 ml. of .1 N HCl and stirred overnight at room temperature. The solvent was then distilled off in vacuo while being replaced with water. The crude oil that separated crystallized on being stirred with water. Crude 2'-benzoyl-4'-chloro - 2 - hydroxyiminoacetanilide (M.P. 152–160°) was obtained after filtration and drying in vacuo. Recrystallization from benzene gave the product melting at 163–166°. Further crystallization from benzene gave clusters of light yellow needles melting at 165–166°.

Example 3

A solution of 5.0 g. (16.5 mmols.) of 2'-benzoyl-4'-chloro-2-hydroxyiminoacetanilide in 150 ml. of acetic acid containing 750 mg. of platinum oxide was hydrogenated at 40° and 50 lbs. initial pressure of hydrogen. When about 50 mmols of hydrogen had been absorbed, the reaction was stopped. After filtration to remove the catalyst, the solvent was distilled off in vacuo. The residue was dissolved in methylene chloride, washed with sodium bicarbonate and dried over sodium sulfate. Methylene chloride was distilled off in vacuo and the residue crystallized from ethanol to give 7-chloro-1,3,4,5-tetrahydro-5-phenyl-2H - 1,4 - benzodiazepin - 2 - one melting at 179–182°.

Example 4

A solution of 4.9 grams of 3-chloro-1,3-dihydro-5-phenyl - 7 - trifluoromethyl-2H-1,4-benzodiazepin-2-one 4-oxide in a mixture of 150 ml. of tetrahydrofuran and 50 ml. of 1 N hydrochloric acid was kept at room temperature for a period of 20 hours. Water was then added and the tetrahydrofuran was distilled off at reduced pressure. A colorless oil separated which crystallized on standing to give 2'-benzoyl-2-hydroxyimino-4'-trifluoromethyl-acetanilide melting at 146–148° C. Recrystallization of the product from a mixture of benzene and hexane gave colorless prisms of pure product melting at 183–184.5° C.

The so-formed 2'-benzoyl-2-hydroxyimino-4'-trifluoromethylacetanilide can be converted into 1,3,4,5-tetrahydro-7-trifluoromethyl-5-phenyl-2H-1,4-benzodiazepine-2-one by the techniques described in Example 3.

Example 5

To a solution of 2.9 grams of 3-chloro-1,3-dihydro-7-nitro-5-phenyl-2H-1,4-benzodiazepin-2-one 4-oxide in 100 ml. of tetrahydrofuran, there was added 10 ml. of 1 N hydrochloric acid. The resultant reaction medium was permitted to stand for a period of 50 hours at room temperature. Water was then added and the tetrahydrofuran was distilled off under reduced pressure. A solid which formed was separated by filtration and was found to be 2'-benzoyl-2-hydroxyimino-4'-nitroacetanilide melting at 192–194° C. Recrystallization from benzene gave yellow needles of the product melting at 190–192° C.

The so-formed 2'-benzoyl-2'-hydroxyimino-4'-nitroacetanilide can be converted into 7-amino-1,3,4,5-tetrahydro-5-phenyl-2H-1,4-benzodiazepin-2-one by the preparative techniques described in Example 3.

We claim:

1. A process for the preparation of a 1,4-benzodiazepin-2-one which comprises catalytically hydrogenating a compound of the formula

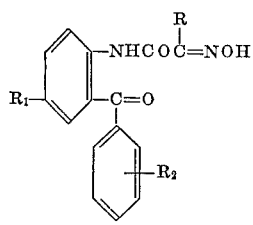

wherein $R_1$ and $R_2$ are hydrogen, halogen, nitro, trifluoromethyl and lower alkyl and R is selected from the group consisting of hydrogen and lower alkyl whereby to effect ring closure thereof to the aforesaid 1,4-benzodiazepin-2-ones.

2. A process as defined in claim 1 wherein the compound of the formula

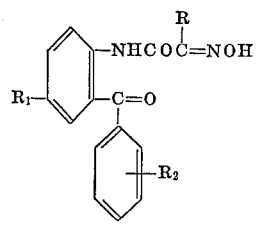

wherein $R_1$ and $R_2$ are selected from the group consisting of hydrogen, halogen, nitro, trifluoromethyl and lower alkyl and R is selected from the group consisting of hydrogen and lower alkyl is prepared by hydrolyzing a compound of the formula

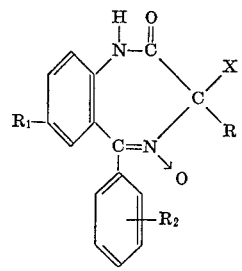

wherein $R_1$, $R_2$ and R are as above and X is halogen.

3. A process as defined in claim 2 where in the formulae illustrated therein, R and $R_2$ are both hydrogen and X and $R_1$ are both chlorine.

4. A process as defined in claim 2 wherein the hydrolysis of compounds of Formula II therein is effected in a water-containing acidic medium.

5. A process as defined in claim 2 wherein the hydrolysis of compounds of Formula II therein is effected in a water-containing neutral medium.

6. A process as defined in claim 1 wherein R and $R_2$ are hydrogen.

7. A process as defined in claim 6 wherein $R_1$ is halogen.

References Cited

UNITED STATES PATENTS 3,247,187    4/1966    Fryer et al. _____ 260—239.3

HENRY R. JILES, *Primary Examiner.*

ROBERT T. BOND, *Assistant Examiner.*